(12) United States Patent
Hunt et al.

(10) Patent No.: US 11,165,822 B2
(45) Date of Patent: Nov. 2, 2021

(54) IDENTIFYING PHISHING WEBSITES USING DOM CHARACTERISTICS

(71) Applicant: RiskIQ, Inc., San Francisco, CA (US)

(72) Inventors: Adam Hunt, El Cerrito, CA (US); David Pon, Sunnyvale, CA (US); Chris Kiernan, San Francisco, CA (US); Ben Adams, San Ramos, CA (US); Jonas Edgeworth, San Francisco, CA (US); Elias Manousos, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/808,182

(22) Filed: Mar. 3, 2020

(65) Prior Publication Data

US 2020/0204587 A1  Jun. 25, 2020

Related U.S. Application Data

(63) Continuation of application No. 15/382,480, filed on Dec. 16, 2016, now Pat. No. 10,581,908, which is a
(Continued)

(51) Int. Cl.
*H04L 29/06* (2006.01)
*G06F 21/12* (2013.01)
(Continued)

(52) U.S. Cl.
CPC ........ *H04L 63/1483* (2013.01); *G06F 21/128* (2013.01); *H04L 9/3247* (2013.01);
(Continued)

(58) Field of Classification Search
CPC ............... H04L 63/1483; H04L 9/3247; H04L 63/0876; H04L 63/1416; H04L 63/1433;
(Continued)

(56) References Cited

U.S. PATENT DOCUMENTS 9,292,493 B2  3/2016  Chandramouli et al.
9,436,763 B1  9/2016  Gianos et al.
(Continued)

OTHER PUBLICATIONS

U.S. Appl. No. 15/382,480, Final Office Action dated Jul. 24, 2018.
(Continued)

*Primary Examiner* — Richard A McCoy
(74) *Attorney, Agent, or Firm* — Wade IP Law PLLC

(57) ABSTRACT

Embodiments of the present invention are directed to identifying phishing websites by rendering and analyzing document object model (DOM) objects associated with a website for features that indicate phishing behavior. Embodiments analyze the full scope and functionality associated with a website by executing functions embedded in a DOM object before analyzing the website for phishing activity. Accordingly, embodiments render and analyze a fully executed DOM object for phishing behavior. Embodiments may then perform steps to mediate a website that is classified as performing phishing. Thus, embodiments are configured to (1) collect website information from a variety of websites and web servers connected to the internet, (2) analyze the collected data to determine whether the website information is performing phishing, and (3) mediate websites and other actors that are determined to be performing phishing based on the results of the phishing analysis.

20 Claims, 9 Drawing Sheets

Related U.S. Application Data continuation of application No. 14/938,802, filed on Nov. 11, 2015, now Pat. No. 9,578,048.

(60) Provisional application No. 62/219,623, filed on Sep. 16, 2015.

(51) Int. Cl.
  *H04L 9/32* (2006.01)
  *H04L 29/08* (2006.01)
  *G06F 16/958* (2019.01)
  *G06F 16/951* (2019.01)

(52) U.S. Cl.
  CPC ...... *H04L 63/0876* (2013.01); *H04L 63/1416* (2013.01); *H04L 63/1433* (2013.01); *H04L 63/20* (2013.01); *H04L 67/10* (2013.01); *G06F 16/951* (2019.01); *G06F 16/958* (2019.01); *G06F 2221/2119* (2013.01); *H04L 63/1425* (2013.01)

(58) Field of Classification Search
  CPC ..... H04L 63/20; H04L 67/10; H04L 63/1425; G06F 21/128; G06F 16/958; G06F 16/951; G06F 2221/2119
  See application file for complete search history.

(56) References Cited

U.S. PATENT DOCUMENTS

| | | |
|---|---|---|
| 9,578,048 B1 | 2/2017 | Hunt et al. |
| 9,645,983 B1* | 5/2017 | Tuan ...................... G06F 16/957 |
| 10,051,001 B1* | 8/2018 | Ashley .................... H04L 63/14 |
| 2006/0101334 A1* | 5/2006 | Liao ........................ H04L 51/18 |
| | | 715/205 |
| 2007/0118528 A1 | 5/2007 | Choi et al. |
| 2009/0157675 A1* | 6/2009 | Stellhorn ............. G06Q 10/107 |
| 2010/0095375 A1* | 4/2010 | Krishnamurthy ..... G06F 21/554 |
| | | 726/22 |
| 2013/0086677 A1 | 4/2013 | Ma et al. |
| 2013/0139238 A1 | 5/2013 | Ryan |
| 2014/0033307 A1 | 1/2014 | Schmidtler |
| 2014/0283067 A1 | 9/2014 | Call et al. |
| 2015/0287047 A1 | 10/2015 | Situ et al. |
| 2016/0337401 A1 | 11/2016 | Bendersky et al. |
| 2017/0078310 A1 | 3/2017 | Hunt et al. |
| 2017/0099319 A1 | 4/2017 | Hunt et al. |

OTHER PUBLICATIONS

U.S. Appl. No. 15/382,480, Non-Final Office Action dated Feb. 22, 2018.

U.S. Appl. No. 15/382,480, Non-Final Office Action dated Mar. 21, 2019.

U.S. Appl. No. 15/382,480, Notice of Allowance dated Oct. 23, 2019.

* cited by examiner

Document Object Model

```
<?xml version="1.0" encoding="UTF-8"?>
<!DOCTYPE html PUBLIC "-//W3C//DTD HTML 4.01//EN" "http://www.w3.org/TR/html4/strict.dtd">

<html class="yui3-js-enabled" style="overflow-x: hidden;">
  <head>
    <meta http-equiv="Content-Type" content="text/html"/>
    <title>Yahoo! Mail: The best web-based email!</title>
    <meta http-equiv="Pragma" content="no-cache"/>
    <meta http-equiv="Expires" content="0"/>
    <script src="https://s.yimg.com/lq/lib/3pm/cs_0.1.js"/>
    <script type="text/javascript">var startTime = new Date().getTime(); var loadTime = null;</script>
```
301

Response Body

```
<!DOCTYPE HTML PUBLIC "-//W3C//DTD HTML 4.01//EN" "http://www.w3.org/TR/html4/strict.dtd">
<html>
<head>
<meta http-equiv="Content-Type" content="text/html">
<title>Yahoo! Mail: The best web-based email!</title>

<meta http-equiv="Pragma" content="no-cache">
<meta http-equiv="Expires" content="0">
<script type="text/javascript">
var startTime = new Date().getTime();
var loadTime = null;
</script>
  <script language=javascript>
```
302

IDENTIFYING PHISHING WEBSITES USING DOM CHARACTERISTICS

CROSS-REFERENCES TO RELATED APPLICATIONS

This application is a continuation of, and claims the benefit and priority of U.S. Non-Provisional patent application Ser. No. 15/382,480 filed Dec. 16, 2016, which is a continuation of, and claims the benefit and priority of U.S. Non-Provisional patent application Ser. No. 14/938,802 filed on Nov. 11, 2015, now U.S. Pat. No. 9,578,048, issued Feb. 21, 2017, which is a non-provisional application of and claims the benefit of priority to U.S. Provisional Application No. 62/219,623 filed Sep. 16, 2015, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

This application is related to U.S. Non-Provisional patent application Ser. No. 16/141,917, filed Sep. 25, 2018, which is a continuation of U.S. Non-Provisional patent application Ser. No. 15/625,877, filed Jun. 16, 2017, and issued as U.S. Pat. No. 10,084,779, which is a continuation of U.S. Non-Provisional patent application Ser. No. 15/161,109, filed May 20, 2016, and issued as U.S. Pat. No. 9,686,283, which is a continuation of U.S. Non-Provisional patent application Ser. No. 14/938,814, filed Nov. 11, 2015, and issued as U.S. Pat. No. 9,386,037, which claims the benefit of priority to U.S. Provisional Application No. 62/219,624 filed Sep. 16, 2015. The above-identified patent applications and issued patent are hereby incorporated by reference in their entirety for all purposes.

BACKGROUND

As people use the internet for more sensitive activities including managing banking accounts, health information, and pretty much every other facet of a person's life, the incidence of phishing attacks has increased. A phishing attack is a type of fraud attack where a website or communication (e.g., an email) from a website represents itself as being associated with a false identity in order to obtain sensitive information or other valuables from a user. For example, a phishing website may be configured to appear to be a consumer's bank website or the phishing website may send an email that appears to be from a consumer's bank with a link that directs the consumer to a phishing website. The phishing website may then ask the consumer for sensitive information (e.g., financial information, username, password, etc.). The operator of the phishing website may then use the sensitive information to initiate fraudulent transactions or may sell the sensitive information to others that use the information to initiate fraudulent transactions.

Many times phishing attacks may be initiated by a malicious third party hacking into a legitimate website provided by a different webhost and embedding software into the website that performs phishing attacks without the webhost knowing. Many times the software that is installed is provided in the form of a "phishing kit" where a single hacker designs and sells a toolkit to other providers that performs the phishing attack functionality. The phishing kits can be applied modularly and may use information obtained from a number of different server computers. Each kit may be branded by one or more entities in which they are attempting to mimic (e.g., PayPal™, Amazon™, eBay™, etc.). The phishing kit may include the relevant pictures, design features, and any other content that tricks a user into thinking that the website is a bank website, a medical provider, an e-commerce store front, etc. Many times these phishing kits are very sophisticated and are designed to evade traditional phishing detection methods. Thus, phishing website operators may hack into a website, implement one of the kits, and start receiving sensitive consumer information from consumers that happen across the website and are tricked into believing the website is legitimate.

Traditional phishing detection systems evaluate static website information (e.g., HTML code received from a website) to determine if a website is a phishing website. For example, a phishing scanner may analyze the content, features, and brands (e.g., website domain provider) embedded in a URL and do not load a webpage when determining whether a website is performing a phishing attack. However, the use of static website information is limited in its accuracy and abilities to identify phishing. For example, dynamic web content that will not be loaded when looking at static website information and such content will not be analyzed by static phishing detection systems. Additionally, many characteristics that identify phishing behavior cannot be observed through static website information. Accordingly, there is a need for more effective, efficient, and accurate phishing detection of sophisticated phishing attacks.

Embodiments of the present invention solve these and other problems individually and collectively.

BRIEF SUMMARY

Embodiments of the present invention are directed to identifying phishing websites by rendering and analyzing document object model (DOM) objects associated with a website for features that indicate phishing behavior. Embodiments analyze the full scope and functionality associated with a website by executing functions embedded in a DOM object before analyzing the website for phishing activity. Accordingly, embodiments render and analyze a fully executed DOM object for phishing behavior. Embodiments may then perform steps to mediate a website that is classified as performing phishing. Thus, embodiments are configured to (1) collect website information from a variety of websites and web servers connected to the internet, (2) analyze the collected data to determine whether the website information is performing phishing, and (3) mediate websites and other actors that are determined to be performing phishing based on the results of the phishing analysis.

One embodiment is directed to a method of identifying phishing websites at a computer system. The method comprising receiving website information from a web server corresponding to a website, rendering a document object model (DOM) object of the website using the website information, and extracting a plurality of features from the DOM object. The method further comprises identifying a first subset of the plurality of features, applying a first phishing model to the first subset of the plurality of features to obtain a first indication of whether the website is performing phishing, determining a classification about whether the website is phishing based on the first indication, and reporting a phishing occurrence when the classification specifies that the website is performing phishing.

Another embodiment is directed to a computer. The computer comprising a processor and a computer product coupled to the processor where the computer product comprises code, executable by the processor, to provide a computer program configured to identify phishing websites. The computer program configured to perform a method comprising receiving website information from a web server corresponding to a website. The computer program further configured to render a document object model (DOM) object of the website using the website information, extract a plurality of features from the DOM object, and identify a first subset of the plurality of features. The computer program further configured to apply a first phishing model to the first subset of the plurality of features to obtain a first indication of whether the website is performing phishing, determine a classification about whether the website is phishing based on the first indication, and report a phishing occurrence when the classification specifies that the website is performing phishing. Other embodiments are directed to systems, portable consumer devices, and computer readable media associated with methods described herein.

A better understanding of the nature and advantages of the present invention may be gained with reference to the following detailed description and the accompanying drawings.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers can indicate identical or functionally similar elements.

BRIEF DESCRIPTION OF THE DRAWINGS

FIG. 3 shows an exemplary DOM object and a corresponding exemplary HTML code body response, according to one embodiment of the present invention.

FIG. 4 shows the changes to the DOM object as the functions contained with the website information are executed, according to one embodiment of the present invention.

TERMS

Figure 1:
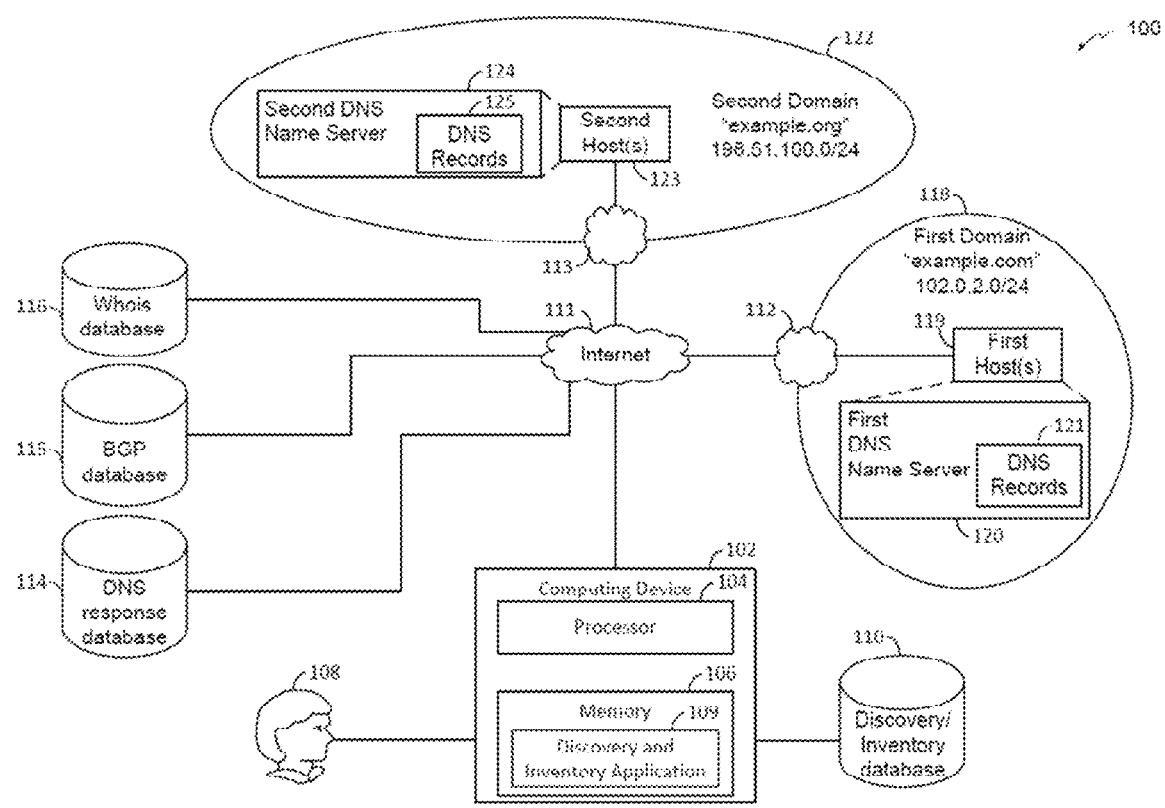
FIG. 1 shows a website crawling and discovery system, according to one embodiment of the present invention.

A "phishing model" may include any set of information that can be used to predict whether a website associated with received website information is performing phishing. The phishing model may apply different types of data analysis including, for example, a decision tree analysis, a phishing score-based threshold analysis, or a probability-based analysis. In some embodiments, multiple phishing models may be applied to information associated with a website and each of the results of applying the multiple phishing models may be used to determine whether a website is performing phishing. Phishing models may be generated using supervised machine learning techniques including a training set of website information associated with a set of websites that have been confirmed as performing phishing and confirm as not performing phishing. Further, the training set of website information may be updated, randomly selected, and/or otherwise dynamically changed over time to increase the accuracy of the phishing models over time. Additionally, in some embodiments, the features included in a phishing model may be randomly selected and the phishing rules may be determined based on the selected features and their accuracy in determining whether a website is performing phishing.

A "phishing rule" may include any condition that can be applied to one or more features associated with a website. A phishing model may include one or more phishing rules which may be used to determine whether information received from a website indicate that the website is performing phishing. Each of the phishing rules may have a binary result where one of two results is determined for each application of a rule based on whether a condition is met or not. A phishing rule may be applied to a subset of a features extracted from a DOM object to determine whether a condition is met and thus to determine the result of the phishing rule as either yes (i.e., binary result 1) or no (i.e., binary result 0). In some embodiments, phishing rules may be stacked in a phishing model such that the result of one phishing rule determines a next phishing rule within a phishing model to apply to the features extracted from the DOM object of a website.

A "node" may include a decision point for a phishing model. A phishing model may include a first node, one or more subsequent nodes, and a final node. The final node may include a final phishing rule with at least one outcome of the phishing rule including an indication of whether a website is phishing or not.

"Features" extracted from a DOM object may include any information that can be derived from a DOM object. For example, the features may include information contained within the DOM, information about a website including a network address, the amount of information provided by the website, and/or information obtained from other websites who are contacted as part of executing features within a rendered DOM.

A "subset" may include one or more of a set of information. For example, a subset of features may include one or more features that are selected from a set of extracted features. A subset of features may be selected randomly or selected deterministically based on the importance of such features in accurately determining whether a website is performing phishing.

A "Document Object Model object" or "DOM object" is a platform- and language-neutral interface that allows programs and scripts to dynamically access and update the content, structure and style of documents. The documents may include any data that can be exchanged and stored by computer environments. For example, a document may include received HTML code for a webpage. The DOM object may define the logical structure of documents and the way a document is accessed and manipulated through a tree structure, called a DOM tree. The document can be further processed and the results of that processing can be incorporated back into the presented page to provide an updated DOM object. The DOM object allows client-side applications to dynamically access, interact, and update information received from one or more remote server computers associated with website information received from a web server computer.

"Website information" may include any relevant information associated with a host website. For example, website information may include a URL for the website, the HTML code (e.g., HTML tags, headers, content, etc.) received once contacting the web server, instructions for contacting other remote server computers for content, executable functions (e.g., JavaScript™ scripts, SilverLight™ scripts, Flash™ scripts, etc.) for loading executable information within the website, meta data associated with the HTML code, and any other information that may be received from a web server for rendering a webpage associated with a website.

DETAILED DESCRIPTION

Embodiments of the present invention are directed to identifying phishing websites by rendering and analyzing document object model (DOM) objects associated with the website for features that indicate phishing behavior. Embodiments provide a phishing detection system for websites performing obfuscated and other sophisticated phishing schemes that may avoid traditional detection systems.

For example, a web server may provide website information in response to a request for a webpage that includes hundreds of third party requests to other web servers. For instance, a social media network page may have as many as 500 requests to various third party web servers while loading. The various web content server computers may provide dynamic and interactive content for the webpage. In such websites, the HTML code provided by the original web server may include executable code (e.g., JavaScript™) that when executed by a java client present on the user's computer and/or the browser can perform any number of different functions. As such, a small amount of code can, when executed, include a large amount of functionality and generate a large amount of additional information received and provided by the web site and any number of other websites. However, by rendering a DOM object and fully executing all of the JavaScript™ and other executable functions embedded in the HTML code, a full view of the functionality of the website may be obtained. When rendering the DOM object, the browser takes the HTML code and builds a DOM tree. The DOM tree can be updated which can manipulate the HTML code being executed by the browser.

Obfuscated phishing includes phishing websites which use embedded executable functions within website information (i.e., JavaScript™) to perform the actual phishing functionality. As such, traditional static HTML analysis software may not be capable of determining that the website is performing phishing. As such, websites may use JavaScript™ and other executable code to obfuscate inputs so that traditional phishing detection systems that do not analyze a rendered DOM would not be capable of identifying the phishing activity.

Moreover, embodiments may be capable of identifying phishing in cases where there is no HTML code. Thus, embodiments provide more effective phishing detection over traditional phishing detection systems which may not recognize that there is any activity (due to the lack of HTML code). For example, such systems may not be capable of analyzing phishing behavior for webpages that do not have any HTML code at all and instead, there is a single script that loads in that page that dynamically performs all of the phishing activity. Thus, embodiments may be capable of identifying the phishing functionality due to the use of a fully rendered DOM object while traditional phishing detection systems would not be capable.

Embodiments of the present invention are directed to an automated discovery and tracking tool that automatically discovers, tracks, and reports phishing websites. For example, a computer system may request website information from a web server associated with a website address, email, etc. The web server computer may send back some HTML code including some JavaScript™ or other executable functions embedded into the HTML code. A computer's browser may then execute the JavaScript™ which changes the HTML because the JavaScript™ alters the displayed information and the functionality of the website displayed through the HTML code by the browser. Once all of the JavaScript™ has been executed, a rendered DOM may be present which includes all the relevant information a website may be associated with and includes all the executed functionality included within the website information. Thus, the rendered DOM object provides a full picture of the possible information accessible and available through a website. Accordingly, website information that appears to be harmless based on the HTML code but which includes JavaScript™ functions may in fact include malicious code, functionality to contact malicious third party server computers, and may be a threat to a computer system or user.

Accordingly, embodiments of the present invention are capable of identifying embedded malicious functionality within a website by executing the available functions, rendering a fully executed DOM object for a website, and analyze the DOM for features that are indicative of phishing activity that otherwise may not be recognized through analysis of static or HTML code associated with a website.

Thus, embodiments provide a deeper understanding of a website. Accordingly, the deeper understanding you can provide for a website or email (or other actor), the more information you can extract from a phishing actor, the more information is available to show a pattern across phishing kits, phishing actors, common sources of phishing information, common targets of phishing activity, etc. As such, embodiments provide a deeper understanding of phishing behavior by analyzing the full activity and functionality associated with a website, email, or other static code. Further, by using the full activity of the various actors, commonalities between phishing kits allows embodiments to target similarities between these thousands of phishing websites, emails, and/or other attacks. Thus, embodiments provide easier and more effective recognition, diagnosing, and mediation of phishing websites, hosts, kit providers, etc. at the source of the phishing activity.

Accordingly, embodiments of the present invention identify and analyze phishing commonalities and/or characteristics that indicate that a website, email, or other activity is performing phishing. Embodiments may then use these commonalities to draw bigger pictures regarding who is providing the phishing kits and how they are constructed as opposed to just a single phishing webpage. Thus, embodiments allow computer systems to look at a whole ecosystem of phishing and improve mitigation abilities associated with phishing websites across the internet or other communication networks. For example, some embodiments may determine that multiple phishing pages are being served from the same server and embodiments may issue a single take down request for a server as opposed to attacking or requesting shutdown of each individual phishing link or webpage one by one.

Accordingly, embodiments are directed to systems that (1) collect website information from a variety of websites and web servers connected to the internet, (2) analyze the collected data to determine whether the website information is performing phishing, and (3) mediate websites and other actors that are determined to be performing phishing based on the results of the phishing analysis.

I. Data Collection

Embodiments include a variety of methods for identifying and collecting website information. For example, website information may be obtained using a web crawling system that is configured to systematically determine website resources associated with a particular host web server, organization, and/or other related parameters and discover new websites associated with those parties.

A. Referrals

In some embodiments, a system may obtain suspicious or known phishing resources from clients or through other referrals. For example, suspicious emails may be sent from clients that may include links to websites embedded in their email. Clients may also send raw links, chat or messaging resources (e.g., forwarded messages that have phishing links contained within them), and any other sources for phishing links or information.

B. Search Engines

Additionally, some embodiments may crawl or discover websites using high-volume sites and search engines. Threats that are found through high-volume, easily accessible websites and search engines may be more dangerous than others because a user may actually find these malicious websites through their normal course of business and may not suspect the threat exists.

C. Internet Crawling and Website Discovery System

FIG. 1 shows a website crawling and discovery system that is configured to discovery website information from various sources throughout the internet. The crawling and discover system 100 may be used to determine internet-facing assets. For example, the system 100 may enable a user 108 to generate a list of internet-facing assets (e.g., domains, hosts, etc.) that are owned by or affiliated with a particular user or business entity (e.g., corporation). The system 100 may also enable the user 108 to track specific internet-facing assets, or groups of internet-facing assets. The system 100 may be configured to automatically scan/crawl internet-facing assets and notify the user 108 when information associated with an internet-facing asset changes and/or when the internet-facing asset violates a policy specified by the user 108. The system 100 may thus provide automated discovery and inventory of internet-facing assets, which may be faster, more accurate, and/or more convenient than the user 108 manually searching for and tracking such assets, such as in a spreadsheet or other document during a yearly audit.

In some examples, the computing device 102 may include additional components. To illustrate, the computing device 102 may include components to receive input from various devices (e.g., a keyboard, a mouse, a touch screen, a network, a storage device, etc.). In addition or in the alternative, the computing device 102 may include components to output data or media (e.g., a video output interface, an audio output interface, an integrated display, a network interface, a storage device interface, etc.). For example, the computing device 102 may receive input from a user 108 via one or more input interfaces and may output data or media to the user 108 via one or more output interfaces.

The memory 106 may store a discovery and inventory application 109 that may be executed by the processor 104. The discovery and inventory application 109 may be configured to determine a list of internet-facing assets, to compile information related to the internet-facing assets, and to present the list and the information to the user 108. The computing device 102 may be coupled to or in communication (e.g., via a network) with a discovery/inventory database 110. The discovery/inventory database 110 may store data (e.g., results, settings, etc.) associated with the discovery and inventory application 109.

The computing device 102 may be in communication with the internet 111. The computing device 102 may communicate with a domain name system (DNS) response database 114. The DNS response database 114 may store captured DNS messages. The captured DNS messages may include records linking a domain name to one or more internet protocol (IP) addresses (e.g., a single IP address or an IP address block). In some examples, the captured DNS messages may include records (e.g., canonical name (CNAME) records) linking domain names to domain names.

The computing device 102 may be in communication with a border gateway protocol (BGP) database 115 (e.g., a BGP enabled device). The BGP database 115 may store mappings between autonomous system numbers (ASNs) and IP addresses. The BGP database 115 may support ASN queries that include ASN(s) and result in an answer including an IP address, multiple non-contiguous IP addresses, and/or a block of contiguous IP addresses. The BGP database 115 may also support reverse ASN queries that include IP address(es) and result in an answer including ASN(s).

The computing device 102 may be in communication with a whois database 116. The whois database may store information linking an IP address, an IP address block, or a domain name to a whois contact (e.g., a contact name, a physical address, a mailing address, an e-mail address, or a combination thereof). The whois database 116 may support whois queries that include a domain name, an IP address block, or an IP address and result in an answer including a whois contact. The whois database 116 may support reverse whois queries that include a whois contact and result in an answer including a domain name, an IP address block, or an IP address.

In the illustrated example, the computing device 102 communicates with the DNS response database 114, the BGP database 115, and the whois database 116 via the internet 111. In other examples, the computing device 102 may be directly coupled to one or more of the databases 114-116, the computing device 102 may be in direct communication with one or more of the databases 114-116, or the computing device 102 may communicate with one or more of the databases 114-116 via a different network or combination of networks, which may include public network(s) and/or private network(s).

A first domain 118 may be coupled to the internet 111 via a first access network 112. The first domain 118 may be mapped (e.g., via DNS) to one or more IP addresses (e.g., a first subnet represented in CIDR notation as 192.0.2.0/24). The first domain 118 may have an associated domain name, such as "example.com."

It should be noted that although not shown in FIG. 1, the first domain 118 may include one or more sub-domains. The first domain 118 may also be a sub-domain of a larger domain. The first domain 118 may map to one or more IP addresses (e.g., via DNS), where each IP address is associated with a host. As used herein, a host may include general purpose computers, as well as other devices, that have an IP address. For example, a host may include a printer or other internet enabled device.

In the illustrated example, the first domain 118 maps to IP addresses associated with one or more first hosts 119. Each of the first hosts 119 may have an associated hostname (e.g., firsthost.example.com). A hostname may also be referred to as a fully qualified domain name (FQDN). In some examples, a host may have more than one IP address (e.g., have more than one network interface or have more than one IP address per network interface), and one or more of these IP addresses may not be mapped to the first domain 118. For example, a particular computing device may have two IP addresses. One of the IP addresses may map to a first hostname (e.g., firsthost.example.com) and another of the IP addresses may map to a second hostname (e.g., firsthost.example.net). Thus, a particular host device may belong to more than one domain.

One or more of the first hosts 119 may include (e.g., execute) a DNS name server. For example, the first hosts 119 may include a first DNS name server 120. The first DNS name server 120 may include DNS records 121. The DNS records 121 may link a domain name to one or more internet protocol (IP) addresses. In some examples, the DNS records 121 may include records (e.g., CNAME records) linking domain names to domain names. The DNS records 121 may correspond to the first domain 118. For example, the DNS records 121 may store mappings between a hostname of each of the first hosts 119 and a corresponding IP address. In some examples, the DNS records 121 may further include information regarding one or more other domains, such as a second domain 122 (e.g., "example.org"). The DNS records 121 may indicate that the first DNS name server 120 is an authoritative name server for one or both of the first domain 118 and the second domain 122. Some or all of the DNS records 121 may be stored in the DNS response database 114.

The second domain 122 may be coupled to the internet 111 via a second access network 113. The second domain 122 may be mapped (e.g., via DNS) to one or more IP addresses (e.g., second subnet represented in CIDR notation as 198.51.100.0/24).

It should be noted that although not shown in FIG. 1, the second domain 122 may include one or more sub-domains. The second domain 122 may also be a sub-domain of a larger domain. In the illustrated example, the second domain 122 is mapped to IP addresses associated with one or more second hosts 123. Each of the second hosts 123 may have an associated hostname (e.g., secondhost.example.org). In some examples, a host may have more than one IP address (e.g., have more than one network interface or have more than one IP address per network interface), and one or more of these IP addresses may not be mapped to the second domain 122. For example, a particular computing device may have two IP addresses. One of the IP addresses may map to a first hostname (e.g., secondhost.example.org) and another of the IP addresses may map to a second hostname (e.g., secondhost.example.net). Thus, a particular host device may belong to more than one domain.

One or more of the second hosts 123 may include (e.g., execute) a DNS name server. For example, the second hosts 123 may include a second DNS name server 124. The second DNS name server 124 may include DNS records 125. The DNS records 125 may link a domain name to one or more internet protocol (IP) addresses. In some examples, the DNS records 125 may include records (e.g., CNAME records) linking domain names to domain names. The DNS records 125 may correspond to the second domain 122. For example, the DNS records 125 may store mappings between a hostname of each of the second hosts 123 and a corresponding IP address. In some examples, the DNS records 125 may further include information regarding one or more other domains, such as a third domain (e.g., "example.net"). The DNS records 125 may indicate that the second DNS name server 124 is an authoritative name server for one or both of the second domain 122 and the third domain. Some or all of the DNS records 125 may be stored in the DNS response database 114.

Additional details of such a discovery system may be found in U.S. Non-provisional application Ser. No. 14/520,029, filed Oct. 21, 2014, which is hereby incorporated by reference in its entirety for all purposes.

D. Phishing Analysis Restrictions—Brand Recognition

Additionally, in some embodiments, the analysis of website information may be restricted to those websites associated with a particular entity, brand, organization, or other associated entity. For example, there may be too many websites with too much website information to analyze all potential threats on the internet. However, if during a crawling and discover phase it is possible to determine that a subset of the discovered website information is associated with a particular entity, it may be possible to limit the discovered websites to a manageable number for faster and more efficient analysis of discovered website information. For instance, if the system receives a referral including a link to a website potentially performing phishing but the system does not know which brand or organization the potential phishing website is associated with or what organization the phishing website is attempting to present themselves to be, the system may perform a brand recognition process before determining whether the website is performing phishing or not, in order to confirm the website is performing phishing associated with a relevant brand before spending time and system resources to analyze whether the website is performing phishing.

Other potential restrictions may include language within website information, URL domain (e.g., geographic or language restrictions for website domains), etc. Any suitable conditions or restrictions may be applied to determine which websites to analyze for phishing behavior.

II. Data Analysis

Once the system has identified one or more websites potentially performing phishing, the system may contact the website to obtain website information associated with the website and analyze the website information to determine whether the website is performing phishing.

Figure 2:
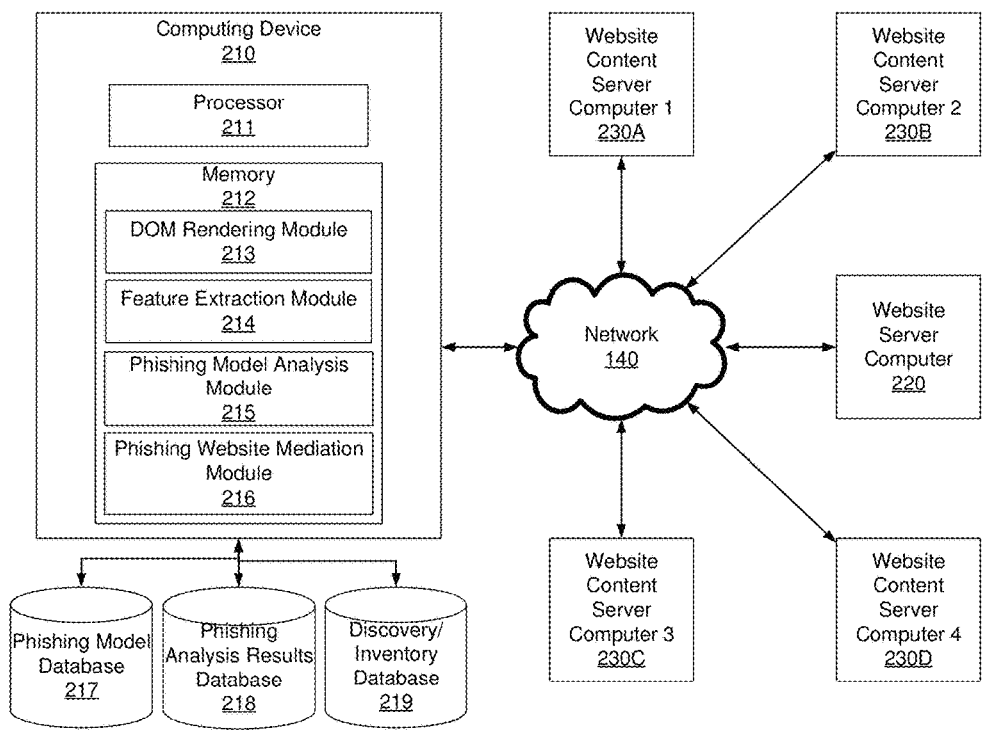
FIG. 2 shows a data analysis system that is configured to analyze whether website information associated with a website server computer is performing phishing, according to one embodiment of the present invention.

FIG. 2 shows a data analysis system that is configured to analyze whether website information associated with a website server computer is performing phishing. The computing device may comprise a processor and a memory. The memory may comprise a DOM rendering module 213, a feature extraction module 214, a phishing analysis module 215, and a phishing website mediation module 216. The computer device may be coupled to a phishing model database 217, a phishing analysis results database 218, and a discovery/inventory database 219. The functionality of the modules 213-216 and the information contained within the databases 217-219 are described in further detail below.

The computing device may be coupled to one or more website server computers and one or more website content server computers through a communication network 140 (e.g., the Internet). The computing device may obtain website information (e.g., HTML code) from the website server computer (which may be identified through the discovery/ inventory database). The website information may include functions and/or instructions that when executed by the computing device cause the computing device to contact and/or post information to the one or more website content server computers. Additionally, the computing device may obtain information from the one more website content server computers while executing the one or more functions embedded in the website information.

A. Methods of Identifying and Determining Websites Performing Phishing

Figure 4:
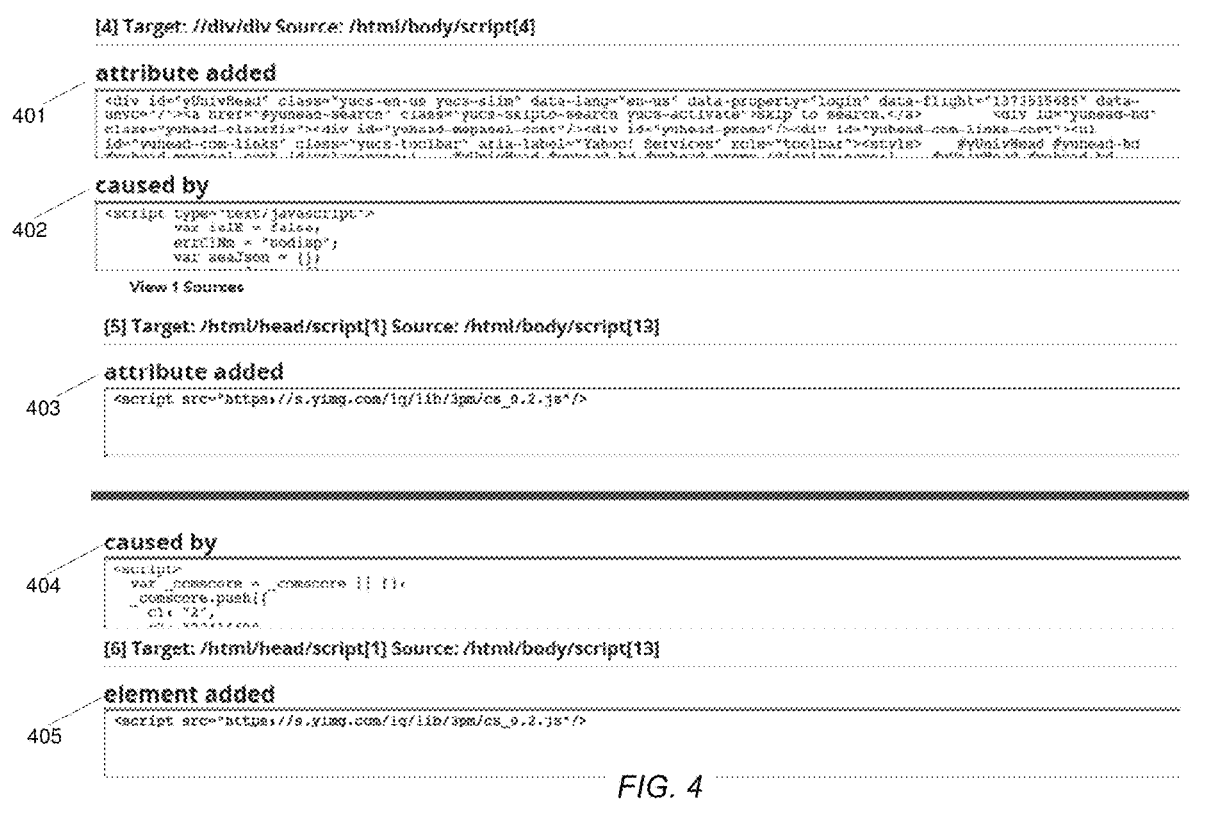
Figure 5:
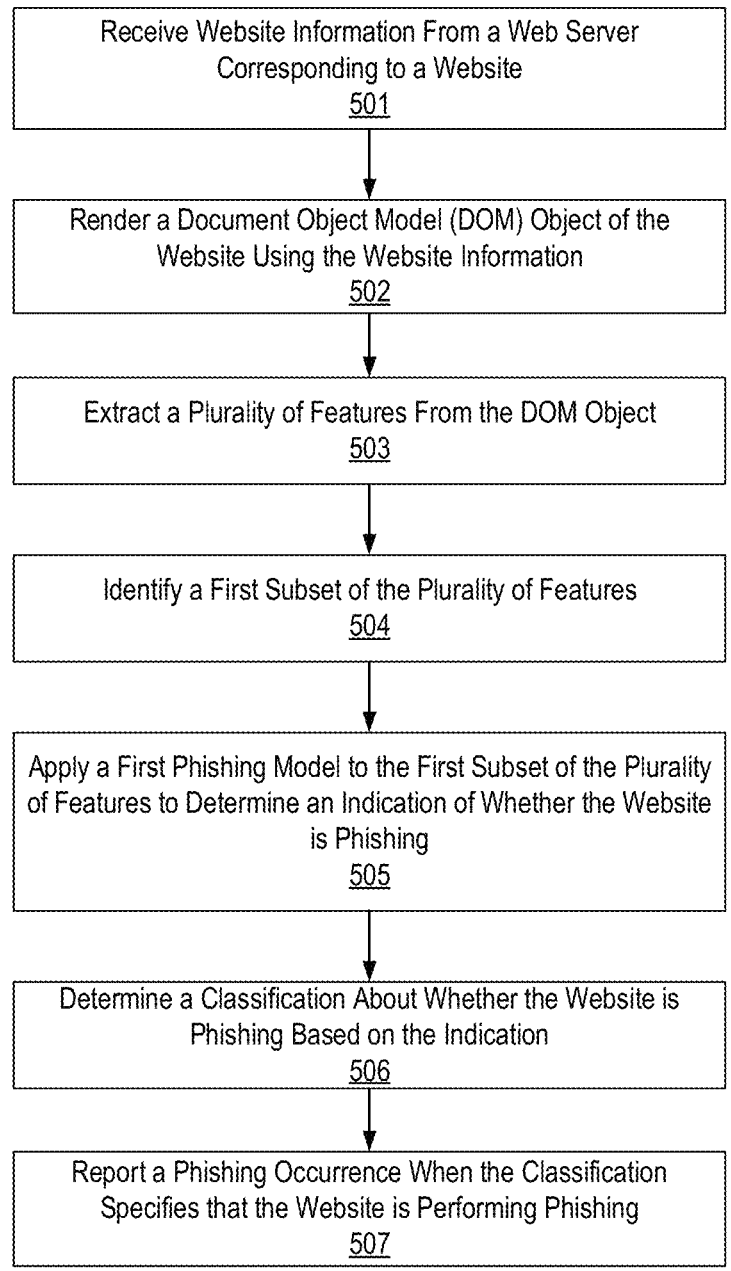
FIG. 5 shows an exemplary method for identifying phishing websites using DOM characteristics using the system shown in FIG. 4, according to one embodiment of the present invention.

FIG. 5 shows an exemplary method for identifying phishing websites using DOM characteristics using the system shown in FIG. 4.

At step 501, a DOM rendering module of the computing device receives website information from a web server corresponding to a website.

At step 502, a DOM rendering module of the computing device renders a document object model (DOM) object of the website using the website information.

At step 503, a feature extraction module of the computing device extracts a plurality of features from the DOM object.

At step 504, a phishing model analysis module of the computing device identifies a first subset of the plurality of features associated with a first phishing model.

At step 505, a phishing model analysis module of the computing device applies a first phishing model to the first subset of the plurality of features to obtain a first indication of whether the website is performing phishing.

At step 506, the phishing model analysis module of the computing device determines a classification about whether the website is phishing based on the first indication.

At step 507, phishing website mediation module of the computing device reports a phishing occurrence when the classification specifies that the website is performing phishing.

Method 500 and any of the methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Any of the steps of any of the methods can be performed with modules, circuits, or other means for performing these steps.

Figure 6:
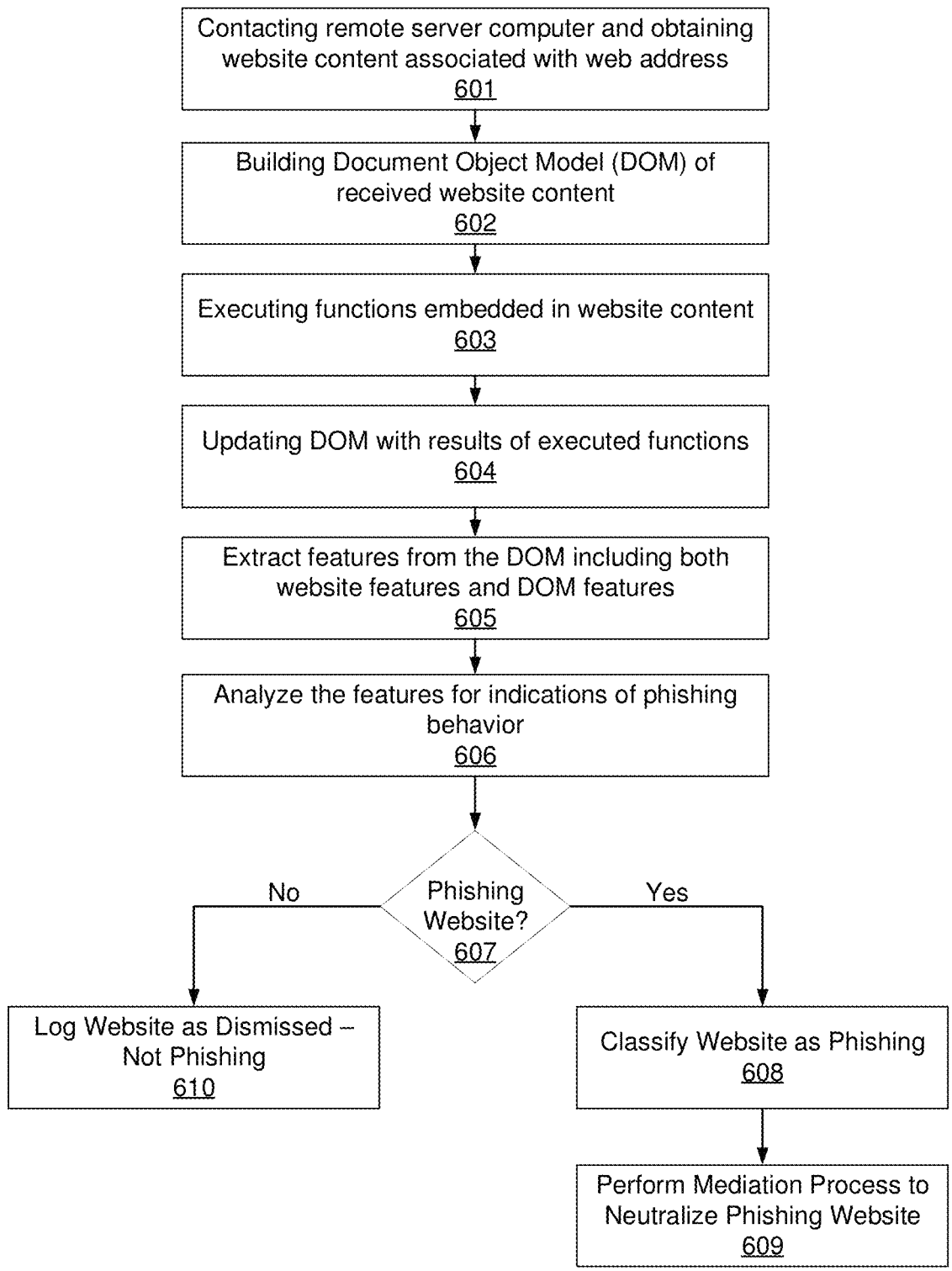
FIG. 6 shows another view of an exemplary method for identifying phishing websites using DOM characteristics using the system shown in FIG. 4, according to one embodiment of the present invention.

FIG. 6 shows an exemplary method for identifying phishing websites using DOM characteristics with additional details regarding the processes described in FIG. 5. For example, steps 602-604 provide additional details regarding the process of rendering a DOM object of a website.

At step 602, the DOM rendering module of the computing device builds a DOM object of website content within the received website information. For example, an exemplary DOM object is shown in FIG. 3.

At step 603, the DOM rendering module executes functions embedded in the website content. For example, JavaScript™ and other executable functions may be embedded in HTML code received from a website. The JavaScript™ may update the DOM object with additional information, features, data, and other content received from other web server computers.

At step 604, the DOM rendering module updates the DOM object with the results of the executed functions. For example, FIG. 4 shows some exemplary changes to the DOM after functions within the website information are executed.

Additionally, as shown in steps 607-610, the phishing model analysis module determines whether the website information indicates that the website is performing phishing and classifies the website as phishing or not phishing based on the application of the phishing model.

B. Rendering a Fully Executed DOM

The DOM rendering module may be configured to render a DOM associated with the received website information. The process of rendering a DOM object may include executing functions included in the website information. The functions may include JavaScript™ and other executable code that instructs a computer to perform particular functionality, obtain information from one or more other server computers connected through the communication network (e.g., obtain media content from a third party computer system), as well as sending (or posting) information to one or more other server computers connected through the communication network. As the functions are executed, the functions may obtain additional HTML code from the other computers and/or may trigger conditions within the existing website information that may result in changes to the existing DOM object. As such, the DOM object may change and may be updated with new HTML code, received information, prompts, media, etc., as the functions are executed. Thus, as the computing system executes each of the functions embedded in the HTML code, the DOM object is altered until all of the available functions are executed within the website information. At this point, the DOM object may be considered fully executed and rendered.

Using a fully executed rendered DOM object is advantageous because no malicious third party software or functionality can be hiding within the website at this point. Thus, the true nature of whether the website is performing phishing can most accurately be determined once all functionality within the website information is executed and a fully rendered DOM object is obtained.

FIG. 3 shows an exemplary DOM object and a corresponding exemplary HTML code body response. As can be seen in FIG. 3, although there is a lot of overlap between the HTML code body response that is received from the server computer and the DOM object, the DOM object has a nested or tree data format that shows the relationship for information within the HTML response body. Additionally, the DOM object includes additional information that is not shown in the HTML code including meta data and source web address information that may not be shown in the response body information.

FIG. 4 shows the changes to the DOM object as the functions contained with the website information are executed. The changes shown in FIG. 4 are illustrative only and any rendering action may include hundreds or thousands of changes depending on the complexity and functionality embedded in the functions embedded into the website information.

C. Extracting Features From a Rendered DOM

The feature extraction module may be configured to extract features from the rendered DOM object. There are many different features included in the DOM object and any of these features may be extracted and used in the DOM object phishing analysis.

1. Types of Features—DOM vs. Non-DOM Features

There are many different types of features that can be extracted from a DOM object. For example, there may be DOM features and Non-DOM features. DOM features are those features that are specific to the content obtained during rendering of a DOM. Non-DOM features are those features that exist independent of the rendering of the DOM. Typically, DOM features may be dynamic such that they change as functions within the DOM are executed. Non-DOM features may be static such that they do not dependent on any functions included in a DOM.

2. Non-DOM Features

Non-DOM features are those features that exist independent of the rendering of the DOM. Non-DOM features may be static such that they do not dependent on any functions included in a DOM. For example, Non-DOM features may include website features that are extracted from the website information (e.g., HTML code received from the web server computer). For instance, website features may include a website response status code, a website response body size, a use of a security protocol by the website, a type of website, a website domain age, a website domain entropy, a website domain length, a website address entropy, and a website address length.

a) Website Response Status Code

A web response status code may include the code provided by a web server computer that indicates the success of a request to access the server computer. For example, different codes may be provided that indicate to a web browser whether a web site is found and a status for the website (e.g., active, suspended, etc.). For instance, a code response of 200 is a success, a code value of 302 is a redirect (i.e., meaning that the web request is forwarded to another web page), a code value of 404 indicates that the website is not found, and any other codes returned in the 400s and 500s are indicative that a website error has occurred.

b) Website Response Body Size

A website response body may include the amount of information contained in the body of the website information (i.e. how much information is returned from the web server). For example, the amount of HTML code received from the web server in kilobytes (KBs), megabytes (MBs), gigabytes (GBs) or any other suitable measurement of digital information. Note that some websites performing phishing may put filler code at the bottom of the webpage to trick unsophisticated phishing detection software.

c) Use of a Security Protocol by the Website

A security protocol may include any type of website security that a web server provides. For example, a web browser may immediately determine whether a website is using secure sockets layer (SSL) security and/or other certificate based security protocols. As such, the feature extraction module may determine whether a website is providing a particular type of security protocol, encryption keys, and/or other security features and may be trigger a feature based on the determination of the type of security features associated with the website information.

d) Types of Websites

A type of website feature may include a determination as to the type of information that is identified by the web address. For example, due to the crawler and discovery system obtaining any information that is internet-facing, much of the resources identified by the crawler may not be traditional websites. As such, the feature extraction module may be configured to determine whether the website information identifies a picture, video, other media content, a website, a restricted website, etc.

e) Website Domain Age

A website domain age feature may include a determination as to the age of the webpage domain. In order to determine the age of the website domain, the feature extraction module may send a request to the whois or DNS systems to obtain the age of the domain. Additionally, the domain age information may be stored in the discovery/inventory database when the website information is originally discovered and/or referred from a third party.

f) Website Domain/Path Entropy

A website domain path may include the address within a domain name that identifies a particular website being requested. Many legitimate websites have a known or logical structure within the domain for websites because naming conventions associated with legitimate content makes it easier to organize content. However, some phishing websites may put filler code in the domain path for the website to trick unsophisticated phishing detection systems that are looking for particular information in the domain. As such, phishing websites tend to include a long string of hex characters in their domain paths. Entropy is a measure based on the distribution of characters in the DOM and a high or low entropy within a domain path may indicate phishing behavior.

g) Website Domain/Path Length

A website domain length may include the length of web http address within a domain based on a number of characters, amount of information, and/or any other relevant measurement. The combination of a long domain/path along with a low entropy may be a strong indicator of phishing activity. Similar measurements may be made for full website addresses.

3. DOM Features

DOM features are those features that are specific to the content obtained during rendering of a DOM. Typically, DOM features may be dynamic such that they change as functions within the DOM are executed. For example, form fields, links to other websites within a DOM object, third party requests, and other features specific to the DOM that may change as functions are executed and the DOM is rendered may be considered DOM features. Each of the various types of features are described in more detail below.

a) Form Field Features

Form fields may include any area within a website that requests information from a user. For example, form fields may include an area displayed in a website that asks for a username, password, zip code, credit card information, address, or any other information within the website. Websites that are performing phishing will typically include form fields because the websites are trying to obtain information from a user. Further, because of the sensitive nature of a consumer's username and password, many websites performing phishing are login pages where a website is pretending to be a login page for a trusted party in order to trick the user into providing their secure credentials for accessing an account or other sensitive information stored within the system.

Thus, the number of form field requests, the placement and location of the form fields within the webpage, and the ratio of form fields to the rest of the information within the webpage may all be analyzed to determine whether a website is likely performing phishing. For example, usually form fields are close to each other in the DOM (but not necessarily in the website information) and by analyzing the location and placement of form fields using a rendered DOM object may provide a different analysis than comparing website information.

b) $3^{rd}$ Party Links Within the DOM

Additionally, the number of $3^{rd}$ party links within a DOM may be another DOM feature that indicates phishing activity. For example, if a webpage includes a small amount of information but a large number of third party links to external websites, this may indicate phishing activity. Further, the placement of third party links within a website may be indicative of phishing. For example, phishing activity may be determined by a raw number of links in a given area which may be obtained by breaking up a screen into different sections and counting the number of links in each section and comparing against each other.

Accordingly, a rendered DOM object may provide additional benefits by allowing an analysis based on the structure of the HTML code. For example, a news site homepage of news site might have a login at the top right of the screen but may also be loaded with links throughout the whole page. In contrast, a phishing login page may typically have a login and then links and a photograph surrounding the login. As such, by identifying the positioning and placement of resources (e.g., $3^{rd}$ party links) within a website, it may allow the system to identify phishing characteristics and behavior based on the structure of the DOM object.

Additionally, the ratio of $3^{rd}$ party links to content within the webpage and/or the same domain may be another feature that indicates phishing activity. Thus, the feature extraction module may obtain a measurement of the number of $3^{rd}$ party links vs. local links and measure ratios or perform other analysis on such information for use in identifying phishing websites.

c) $3^{rd}$ Party Requests

Furthermore, the number of third party resources may also indicate that a website is performing phishing. Third party resources may include a number of times that the computing device is redirected to other websites when rendering the DOM object in order to obtain information from those other websites. Additionally, the third party requests features may log the addresses of web server computers where requests are sent and the addresses from web servers that respond to a post request.

For example, in some embodiments, a redirect score present may be calculated which determines the number of times that the browser is redirected in the DOM when sending requests for information as instructed in the HTML code and/or when executing the functions embedded in the HTML code. Websites that are performing phishing may tend to have a lot of redirects in order to appear to be associated with a legitimate website but then by directing a browser request to a less known and/or regulated webhost.

Additionally, dependent request ratios (e.g., the number, frequency, etc.) of the request may be another DOM feature that indicates a website is performing phishing. For example, the ratio of images and other media that originate from the same domain as your HTTP request as opposed to a different domain may be an indicator of a website performing phishing. For instance, a such a dependent request ratio may be much higher for phishing sites than for a normal site because the phishing website may be requesting a lot of media from a legitimate source (i.e., the domain associated with the party that they are attempting to appear to be) while they are performing the phishing activity from a different domain.

Phishing sites tend to have large number of $3^{rd}$ party requests as opposed to other types of websites. The placement, type of content that is requested, and the clustering of such resources is also important. For example, websites performing phishing may request a lot of images from a particular web domain (e.g., "Bank A" web domain) and cluster them in a particular position within a login screen and the placement and common sources of information may be used to identify phishing activity.

d) DOM-Specific Features

Additionally, some features are generated from the rendering of the DOM itself and indicate phishing behavior based on the characteristics of the DOM rendered for the website. For example, a DOM object length (i.e., the size and/or number of nodes within a DOM) may be a good indicator of phishing since phishing websites tend not to be as complex and deep as legitimate websites.

Furthermore, the DOM Entropy may also indicate phishing activity as phishing websites may have a lower entropy if there is a large amount of filler or random hex characters being embedded into a phishing website to trick unsophisticated phishing detection systems. It provides the variability of characters that appear in the DOM. If there are a lot of the same characters appearing in the DOM, the DOM will have a lower entropy, because it takes fewer characters to represent the DOM. The DOM entropy may be dependent on the language of the website, geographic location, etc. For instance, this calculation may be helpful in identifying filler code provided to make the website appear to be bigger than it is in fact.

A DOM object keyword may also be used to determine whether the DOM includes a particular keyword or string that indicates phishing behavior based on previous analysis of phishing websites. For example, a unique string or statement may be included in a phishing kit that may allow the system to identify if the website is performing phishing.

D. Phishing Model Analysis

The phishing model analysis module may be configured to apply one or more phishing models from the phishing model database to the extracted features. Applying one or more phishing models to the features may include determining a first subset of extracted features that are relevant to a first phishing model. A phishing model may include a number of phishing rules where each phishing rule is located at a first node of a phishing model. Each phishing rule may include a conditional statement that compares one or more features from the extracted features to a conditional rule to determine whether the rule is true or false. Depending on whether the conditional statement is true or false, a next rule, node, and/or result of the phishing analysis is determined.

For instance, applying a first phishing model may include applying a first phishing rule at a first node of the first phishing model to a first feature of the first subset of features to determine whether a condition of the first phishing rule is satisfied. The method may continue by applying one or more subsequent phishing rules at one or more subsequent nodes of the first phishing model to other features of the first subset of features based on a result of applying the first phishing rule. Finally, the process may be completed by applying a final phishing rule at a final node of the first phishing model where the first indication of whether the website is performing phishing is determined based on a result of applying the final phishing rule.

Figure 8:
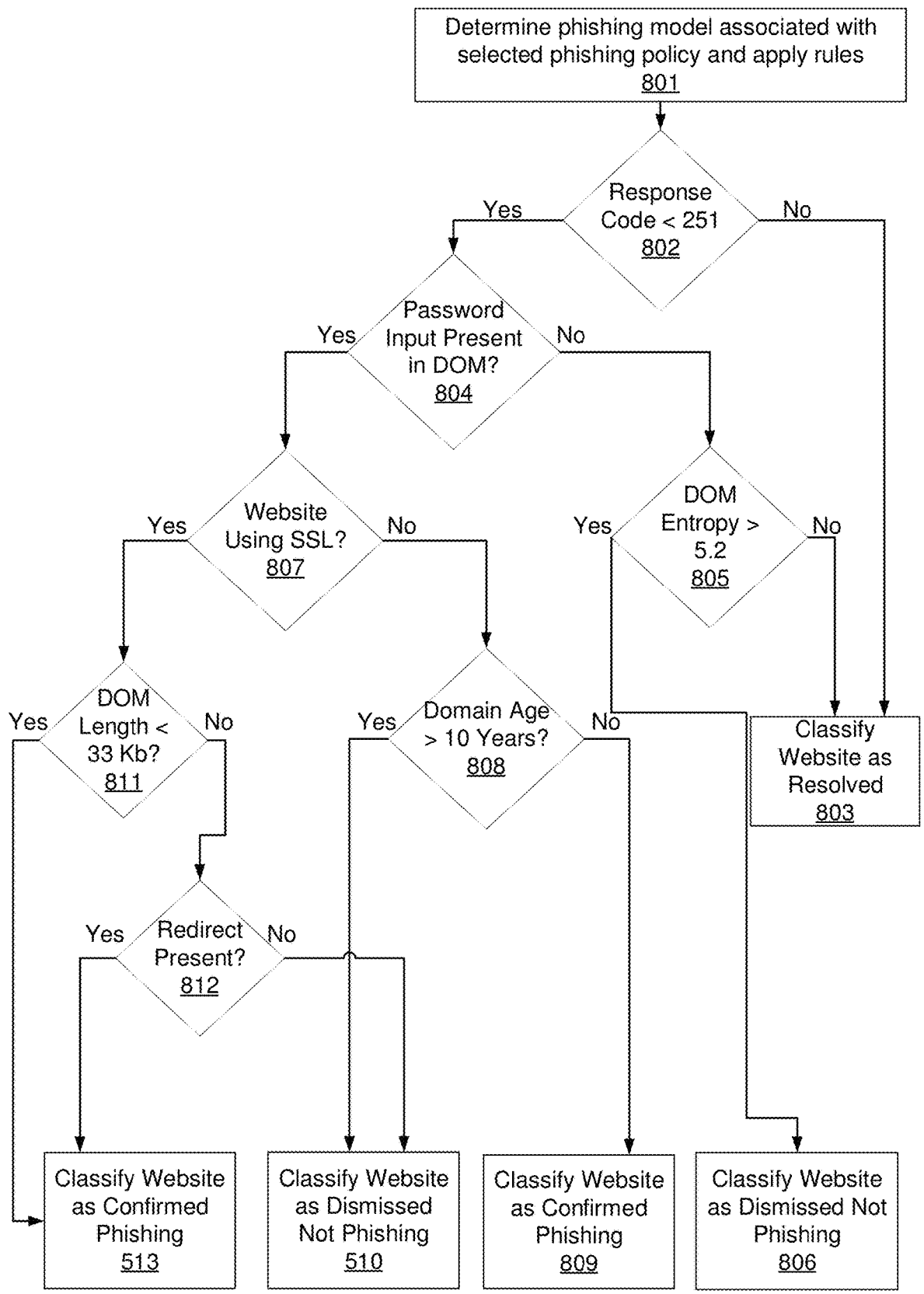
FIG. 8 shows an exemplary method for applying a first phishing model to a first subset of features extracted from a DOM object associated with a website and system shown in FIG. 4, according to one embodiment of the present invention.

FIG. 8 shows an exemplary method for applying a first phishing model to a first subset of features extracted from a DOM object associated with a website and system shown in FIG. 4.

At step 801, the computing device determines a phishing model associated with a phishing policy. A phishing policy may include an analysis engine for determining phishing associated with a website. The phishing policy may include a single phishing model, multiple phishing models, and/or any other relevant client or website specific rules and/or analysis features associated with the particular website information being analyzed. Phishing policies may be discussed in further details below regarding the application of multiple phishing models to website information. Once the phishing model is identified, the applicable rules are determined, and a list of features that are associated with the model may be determined. The relevant features may be extracted from the DOM object and the system may be ready to apply the phishing model to the website information to determine if the website is performing phishing.

At step 802, a first phishing rule at a first node of the phishing model is applied to a first feature of the website information extracted from the rendered DOM. For example, the first rule includes a conditional rule that asks whether a website response code is less than the value 251. If the response code is less than 251, the yes result is obtained and the analysis process moves onto the second rule (step 804). However, if the response code is greater than 251, the answer is no and the analysis process classifies the website as being resolved (step 803). The website response code is a feature that allows the computer system to know whether an error occurs while contacting a website. For example, if a response code is 200, that indicates that the website is in operation. However, if the response code is 300 or higher (error codes built into the HTTP protocol), that indicates that the identified web server could not respond with the requested information. Note that the phishing model shown in FIG. 8 includes multiple different types of potential classifications (phishing, not phishing, and resolved).

At step 803, the computer system determines that the website information is resolved. A website being classified as resolved means that a website that was previously identified as performing phishing is no longer performing phishing and/or is no longer active or available. Thus, the resolved website classification may be used to indicate that a previously identified phishing website has been taken down since the website no longer responds to web browser requests. If the website has not previously been indicated as being confirmed as performing phishing than it may be indicated as temporary not responding and the analysis may be performed again at a later time to ensure the website is still down.

At step 804, if the application of the first phishing rule is yes, then the second phishing rule is applied to other features within the subset of features. For example, the second phishing rule may include a determination as to whether the DOM object includes a password input. This phishing rule is associated with the form field type of DOM object features. The computing system may determine whether the DOM object includes a password input anywhere in the fully rendered DOM object and may extract the number, location, placement, and existence of such form fields while determining the features. As such, if the DOM object contains a password input, the phishing model may determine the condition is met (i.e., yes) and may move onto a subsequent phishing rule associated with that answer (step 807). However, if the DOM object does not include a password input form field, then the condition may not be met and the phishing model may move onto a subsequent phishing rule and node associated with there not being a password input form field (step 805).

In this manner, the phishing model may craft specific paths through the phishing model that include multiple different particular combinations of phishing rules, analyzing particular features, and providing particular classifications. As such, the phishing model may be generated using computer-learning techniques that look at a seed list of confirm phishing and non-phishing websites and may generate accurate phishing models based on the known characteristics of phishing and non-phishing websites. Thus, each of the subsequent phishing rules at one or more subsequent nodes of the first phishing model may be applied until the phishing model arrives at a final phishing node.

For example, at node 805, the result of application of that phishing rule results in a classification of the website. As such, it may be referred to as a final node. Each of the paths through the phishing model may results in application of a final phishing rule at a final node in order to obtain a classification of each and every webpage that is analyzed by the computing system. Thus, an indication of whether a website is performing phishing is determined based on a result of applying the final phishing rule.

At step 805, a DOM entropy is analyzed to determine whether it is larger than 5.2. As explained above, the DOM entropy is a measure of how many different characters are necessary to recreate the DOM. Thus, it is a measurement of the amount of repetition of characters. Here, the rule effectively measures whether the DOM entropy is incredibly high (i.e., lots of repetition). If there is a lot of repetition of characters, the website is classified as being resolved (node 803). If not, the website is classified as not performing phishing (node 806).

At step 806, those final phishing rules at final phishing nodes that result in classifying a website as not phishing may result in the classification provided at classification node 806. The classification is the result of a phishing model path where the conditions triggered by the path of phishing rules within the phishing model indicate that the website is not performing phishing. As such, the phishing model is indicating that the set of seeding websites that had the same characteristics as the phishing rules and features in the phishing model path tended not to be phishing websites. Each of the classification nodes may have an accuracy measurement (not shown) which indicates the seeding website results for the phishing model path ending in that classification node (this may be referred to as the classification node's "path accuracy"). For example, for classification node 806, the phishing model path includes websites that have a response code less than 251, no password input form field present in the DOM, and whose DOM entropy for the website is larger than 5.2. Accordingly, those websites with similar features in the seeding set of websites tended not to be performing phishing.

In some embodiments, each path will have an accuracy measurement such that an operator may determine the likelihood of accuracy of the determination made by the phishing rules applied within the path for a given classification node. For example, classification node 806 could have a path accuracy measurement of 7/30/243. This indicates the number of confirmed phishing websites (i.e., confirmed phishing), confirmed not phishing websites (i.e., dismissed—not phishing), and resolved websites (i.e., websites that were phishing at one point but no longer are phishing). The accuracy measurement may be obtained by dividing the number of dismissed and resolved websites divided by the total number of websites analyzed. For example, for the 7/30/243 website decision results used as an example above, the accuracy measurement would be 273/280 or 97.5% accuracy for not phishing. The accuracy measurement effectively means that the path of phishing rules applied for the phishing model resulted in a 97.5% accurate determination that a website was either not performing phishing or was no longer performing phishing.

Similarly, at step 809, the classification node determines that all websites that follow the phishing model path are confirmed as performing phishing. The phishing model path leading to the determination that the website is performing phishing includes websites where a response code was lower than 251, the website had a password input form field within the DOM, the website did not use secure shell security (i.e., registered certificates), and the website domain was registered less than 10 years ago (i.e., the website is younger than 10 years old). This classification node may also have a phishing accuracy measurement similar to the classification node 509 above. However, the accuracy would be determined by analyzing the number of phishing confirmed websites divided by the total number of results. However, similar processes can be performed for all of the nodes and steps shown in FIG. 8.

Steps 807-813 show additional subsequent and final phishing rules, phishing nodes, and classification nodes for confirmed phishing and dismissed as not phishing under the phishing model. Accordingly, the phishing rules provide additional phishing model paths with different phishing classifications and different accuracy measurements. Similar processes as described above may be performed to obtain a classification for a website through these phishing rules, nodes, and classifications.

E. Generation of a Phishing Model

Phishing models may be generated by the phishing model analysis module of the computing device using any suitable method. For example, phishing models may be generated dynamically during phishing analysis based on the latest information that the system knows about phishing behavior. In other embodiments, the phishing models may be generated, vetted, and used for a particular period of time before being re-calculated. Further, the phishing models may be generated using computer learning based on a training set of website information that has been verified as being associated with websites that are performing phishing and not performing phishing. The phishing model generation module may analyze the characteristics of the training set of website information and identify characteristics that tend to indicate a website is phishing or not phishing by analyzing and comparing the characteristics present in the website information of the training set of websites. The training set may be constantly updated to ensure that new trends in phishing website behavior are captured. The training set may be selected from the phishing analysis results database which may include confirmed phishing and non-phishing websites. Furthermore, various ratios of phishing and non-phishing websites may be selected for the training set to ensure an accurate sampling for characterization of the phishing websites.

Additionally, multiple phishing models may be generated using the same or different sets of training sets of website information. For example, a phishing model generation module may use a first training set to generate a first phishing model and may use a second training set associated with a different client, different random selection of website information, different ratio of phishing vs. non-phishing websites, and/or any other variable to generate a second phishing model. This process may be repeated to generate a number of different phishing models that may be embedded into a single phishing policy that may be applied to website information to obtain a better understanding of the various phishing strategies and features that may indicate phishing activity.

In such phishing policies which implement a number of different phishing models for a single analysis, the results of applying each of the phishing models to the website information may be blended, analyzed, combined and/or analyzed through any suitable method to obtain a final result of a phishing analysis. For example, a first model and a second model may indicate the website information is not performing phishing. However, a third, fourth, and fifth model may result in indications that the website information is performing phishing. As such, the phishing policy may determine that the website is performing phishing by taking a majority vote of the phishing models (3 vs. 2), obtaining a phishing confidence score for each determination and combining to obtain some level of certainty regarding phishing, and/or performing any other statistical analysis of the results in order to obtain a final determination based on the various results of the application of the various phishing models.

F. Generation/Application of a Phishing Policy

A phishing policy includes an analysis tool that provides a final determination of whether a website is performing phishing or not. The phishing policy can determine whether a website is performing phishing using a single phishing model or by applying multiple different phishing models and obtaining a final determination using results from each of the phishing models. As such, there may be many different phishing policies including many different phishing models. A phishing policy may combine the results of applying different phishing models to a set of website information and determine a final answer regarding whether the website information is performing phishing through a number of different analysis methods.

For example, each phishing model may provide a different result of applying the website information to the phishing model based on the specific features that each phishing model include. For instance, the phishing model of FIG. 8 shows a first subset of features that are used at each phishing rule of the various nodes to obtain a classification. However, if different features were selected and used to create a new phishing model, different results could be obtained for the same website information. Thus, where two different results are obtained for two different phishing models applied to a website, the phishing policy may provide a tool for determining which result is correct or should be used. As such, the phishing policy may determine the correct answer based on a majority approach (i.e., of the 10 different phishing models, which answer does the majority of the phishing models support?), a threshold approach (i.e., each phishing model may provide a score and when added up, the phishing model may hit a threshold or not), a statistical approach based on the accuracy of some models over others, visual mapping based, a blending of various types of models, or through any other suitable method.

Figure 7:
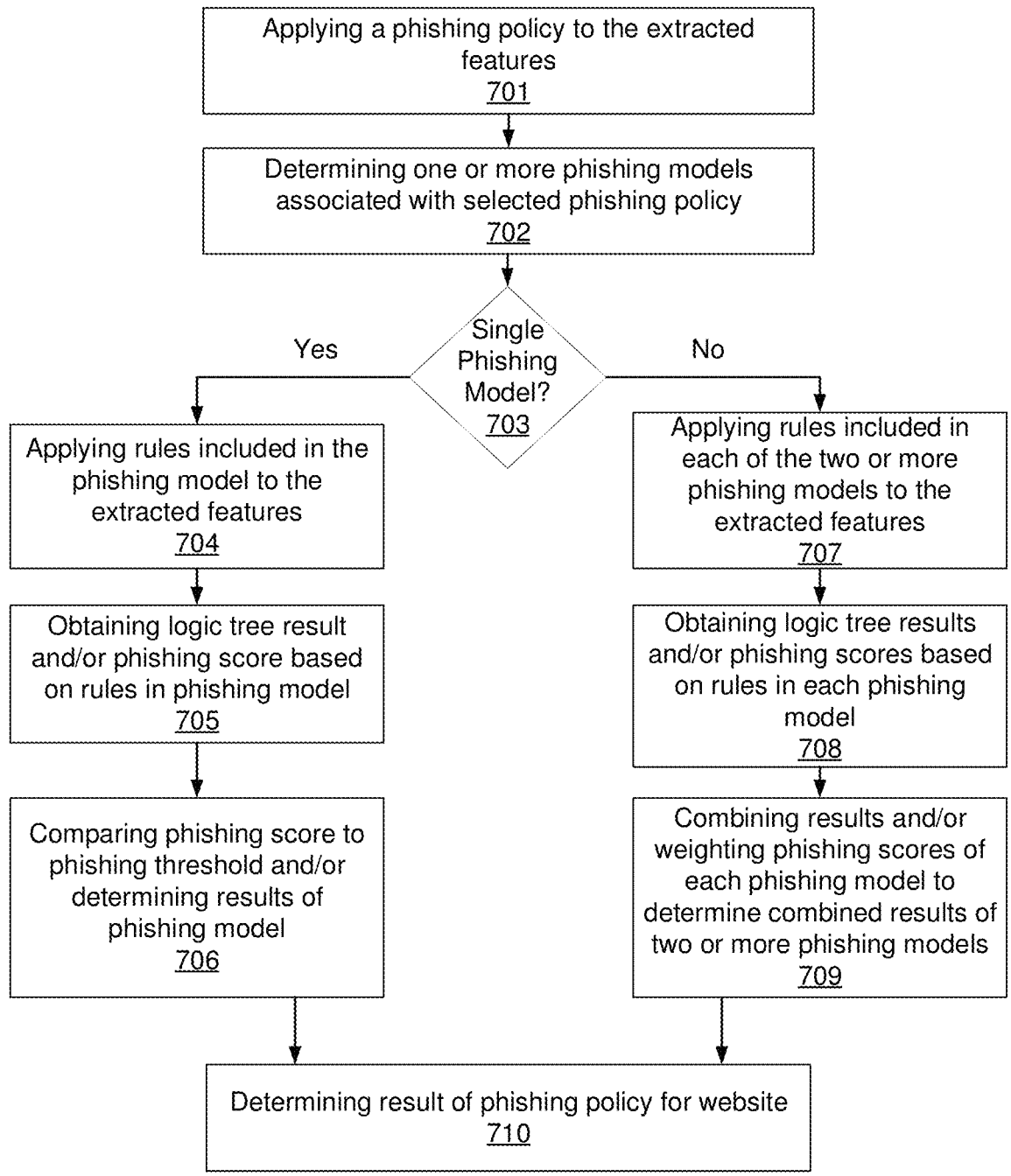
FIG. 7 shows an exemplary method for determining whether a website is performing phishing, according to one embodiment of the present invention.

FIG. 7 shows an exemplary method for determining whether a website is performing phishing showing both those policies that include a single phishing model and multiple phishing models. Before the application of the method shown in FIG. 8, the steps shown in FIG. 6-7 would be performed including rendering a DOM object and determining a phishing policy that applies to the website information and extracting the relevant features for the policy and/or phishing rules, as described above.

At step 701, a phishing model analysis module of the computing device applies a phishing policy to the extracted features. The phishing model analysis module may determine a type of phishing policy to apply based on a client identifier, a website address, a designated geographic region or country of enforcement, and/or any other relevant information that allows the phishing model to determine the most relevant phishing policy to apply to the website information.

At step 702, the phishing model analysis module of the computing device determines one or more phishing models associated with the selected phishing policy. The phishing policy database may include a number of different phishing policies and associated phishing models. Each phishing policy may have one or more phishing models associated with it. The phishing models may be generated dynamically or be stored in a phishing policy database.

At step 703, the phishing model analysis module of the computing device may determine whether the selected phishing policy uses a single phishing model or if the phishing policy is designed to use multiple phishing models.

At step 704, the phishing model analysis module of the computing device determines that the selected phishing policy is associated with a single phishing model and applies the rules included in the phishing model to the extracted features. An exemplary application of a phishing model is shown in more detail in reference to FIG. 8.

At step 705, the phishing model analysis module of the computer device obtains a result of the application of the phishing rules in the phishing model. Note that multiple different types of phishing models may be applied. For example, in some embodiments, the phishing model may result in a phishing score that can be compared to a phishing threshold to determine whether a website is performing phishing. Additionally, in other embodiments, a classification may be determined using a phishing model decision logic tree analysis as described in reference to FIG. 8. Any other suitable models may be used in order to obtain a characterization of the phishing models.

At step 706, the phishing model analysis module of the computing device compares the result of the phishing analysis to a phishing threshold and/or otherwise determines a classification for the website information using the phishing model.

Alternatively, if the phishing policy includes more than a single phishing model, the process moves to step 707 which includes applying each of the two or more phishing models to the website information. For example, a second subset of features may be extracted from the rendered DOM object in order to apply the second phishing model to the second subset of features. The second model may be generated dynamically based on a random collection of features or may be selected from the phishing model database.

At step 708, the phishing model analysis module of the computing device obtains the results of each of the two or more phishing models. In some embodiments, the results may come in different formats, for example, a first phishing model may result in a classification (e.g., phishing) while a second model may result in a phishing score (e.g., 80). The phishing model analysis module may perform any normalization processing steps in order to obtain results that can be compared to each other based on the details of the phishing policy.

At step 709, the phishing model analysis module of the computing device combines the results and/or weights the phishing scores between the various results to determine combined results of the two or more phishing models.

At step 710, the phishing model analysis module of the computing device determines the final result of whether the website is performing phishing. The phishing model analysis module may then report the phishing website depending on the results and/or perform other mediation steps as may be described in the phishing policy.

Note that in some embodiments, the embodiments and techniques described in related U.S. Non-provisional application Ser. No. 14/938,814, titled "USING HASH SIGNATURES OF DOM OBJECTS TO IDENTIFY WEB SITE SIMILARITY," which is filed on the same day as the present application, and which is a non-provisional application of and claims the benefit of priority to U.S. Provisional Application No. 62/219,624 filed Sep. 16, 2015, both of which are hereby incorporated by reference in their entirety for all purposes, may be applied to embodiments described herein in order to identify phishing websites. For example, a hash signature may be generated and used as part of a phishing model to identify similarity to other phishing websites.

III. Action Based on Data Analysis—Mediation

Once the phishing model analysis has been completed and a website has been identified as performing phishing, a phishing website mediation module may be configured to take any relevant steps to mediate a website that has been identified as performing phishing.

A. Mediation of Phishing Website

The phishing website mediation module may perform any number of different activities to mediate a website identified as performing phishing. For example, the phishing website mediation module may report the phishing activity to an entity hosting the web server that is hosting the website. Many times the host is unaware of the phishing activity as their site has been hacked or as they are hosting too many websites to monitor the activity of each website. Many webhosts may then take down the phishing website.

Additionally, the phishing website mediation module may store the results of the phishing analysis in the phishing analysis results database and periodically analyze the identified phishing websites to determine whether the website performing phishing has been "resolved" or taken down. As described above in regards to the application of the phishing models to the website information, the phishing models may include results and classification nodes that indicate resolved websites. Such classifications nodes may be obtained when a previously identified website that is performing phishing is identified to no longer be performing phishing (i.e., the web host removed the phishing functionality from the web site) and/or the website has been taken down (i.e., the web host killed the website such that it no longer is accessible). Thus, embodiments allow the computer system to make sure that an identified website performing phishing is not phishing anymore and/or that the website has been taken down. For example, a web host may only take down part of a website—not an entire site. Thus, the system continues to analyze the website periodically until the website is no longer offending.

As such, embodiments may classify a website associated with the remote server computer as performing phishing and may request updated website information from the remote server computer. The system may further determine an operating status of the website associated with remote server computer and report the operating status of the website to a monitoring system to determine whether additional monitoring is necessary or if the website has been taken down or the phishing functionality has been removed.

B. Tracking/Determining Phishing Sources

Furthermore, in some embodiments, the system may use website information gathered during the rendering of the DOM to identify core phishing driving systems that are commonly associated with multiple phishing websites. For example, the system may gather all the phishing website information and may analyze the information to identify common information sources, web servers, and/or other common features that allow the system to identify sources of the phishing features. Where such a common source is identified, the system may issue a take down or blocking request which could affect a much larger number of phishing websites because it would affect a central driver of multiple different websites dependent on the central source of phishing information. For example, if there is a central server that a subset of identified phishing websites are pinging or a large subset of phishing websites are obtaining the same images or other functionality from a common server, the system may shut down or otherwise interfere with the common source to disable all of the dependent phishing websites. By killing a single source website, it is much easier to take down a large number of websites that are distributed throughout the internet without having to identify each and every website that may be using aspects of the phishing kit designed to use a single source website.

C. Seeding Websites—Confirmed Phishing Websites

Additionally, as the system analyzes the discovered resources for phishing behavior and requests mediation of discovered threats, the system may store confirmed phishing website information that may be used to seed phishing models and may be analyzed to determine new phishing characteristics that may provide insight into new phishing behavior by phishing kit programmers. Accordingly, the system may be configured to store phishing analysis results for future analysis as well as use the previous results to improve the functioning and accuracy of future models.

IV. Exemplary Computer System

Figure 9:
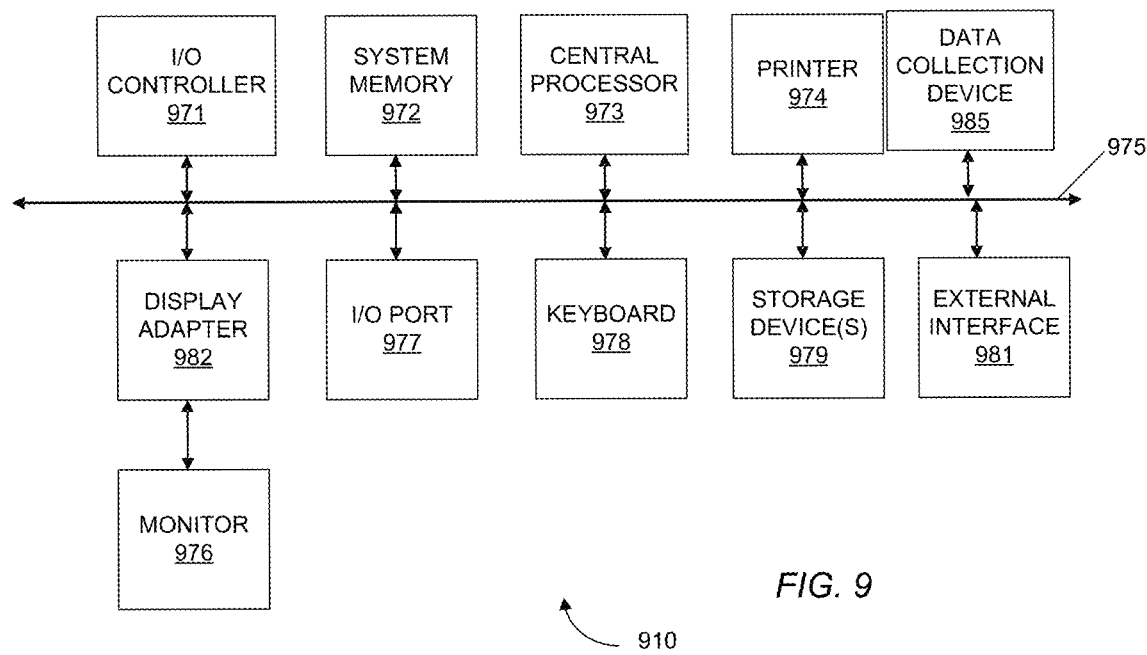
FIG. 9 shows an exemplary computer system.

FIG. 9 shows a block diagram of an example computer system 900 usable with system and methods according to embodiments of the present invention.

Any of the computer systems mentioned herein may utilize any suitable number of subsystems. Examples of such subsystems are shown in FIG. 9 in computer apparatus 900. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 9 are interconnected via a system bus 975. Additional subsystems such as a printer 974, keyboard 978, fixed disk 979, monitor 979, which is coupled to display adapter 982, and others are shown. Peripherals and input/output (I/O) devices, which couple to I/O controller 971, can be connected to the computer system by any number of means known in the art, such as serial port 977. For example, serial port 977 or external interface 981 (e.g. Ethernet, Wi-Fi, etc.) can be used to connect computer system 900 to a wide area network such as the Internet, a mouse input device, or a scanner. The interconnection via system bus 975 allows the central processor 973 to communicate with each subsystem and to control the execution of instructions from system memory 972 or the fixed disk 979, as well as the exchange of information between subsystems. The system memory 972 and/or the fixed disk 979 may embody a computer readable medium. Any of the values mentioned herein can be output from one component to another component and can be output to the user.

A computer system can include a plurality of the same components or subsystems, e.g., connected together by external interface 981 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
contacting a website to obtain information associated with the website, the information including HTML and JavaScript comprising at least one available executable function that results in accessing a second website;
selecting a phishing policy based on the obtained information,
the phishing policy including one or more phishing models,
the phishing policy including an analysis engine for determining phishing associated with the website;
selecting a phishing model from the one or more phishing models to apply to the website,
the phishing model including a plurality of phishing rules;
generating a document object model (DOM) from the obtained information;
identifying the at least one available executable function by accessing the DOM;
retrieving respective incremental HTML by executing each of the at least one available executable function;
for each executed function, modify the document object model with the respective incremental HTML to yield a fully executed DOM when all of the at least one available executable function from the obtained information have been executed;
using the phishing model, extracting a set of features comprising DOM features from the fully executed DOM;
applying the plurality of phishing rules to the set of features to identify the placement and location of form fields for obtaining sensitive information from a user and a ratio of the form fields to other information within the fully executed DOM;
extracting a second set of features comprising Non-DOM features from the fully executed DOM object for the website;
applying a second plurality of phishing rules to the set second of features;
determining whether phishing is performed on the website based on the application of the plurality of phishing rules and the application of the second plurality of phishing rules;
based on a determination that phishing is performed on the website: analyzing website information to identify one or more common sources of phishing features on the website;
and upon identification of the one or more common sources, issuing a take down or blocking request to a host entity of a common source of the one or more common sources.

2. The method of claim 1, wherein the information associated with the website includes one or more of: a client identifier, a website address, a designated geographic region, or a country of enforcement.

3. The method of claim 1, further comprising:
based on the determination that phishing is performed on the website, periodically analyzing the website to determine whether phishing is still being performed on the website.

4. The method of claim 1, further comprising:
based on a determination that phishing is performed on the website, reporting that phishing is performed on the website to an entity hosting a web server that is hosting the website.

5. The method of claim 1, further comprising:
periodically analyzing websites identified as phishing websites to determine whether one or more phishing websites have been taken down.

6. The method of claim 1, further comprising:
periodically analyzing websites identified as phishing websites to determine whether phishing is still being performed on one or more of the phishing websites.

7. The method of claim 1, further comprising:
analyzing information from a plurality of websites identified as phishing websites to determine a central source of phishing activity.

8. The method of claim 1, wherein each phishing rule of the plurality of phishing rules is a conditional statement for assessing a different feature in the set of features.

9. One or more non-transitory computer-readable storage media, storing one or more sequences of instructions, which when executed by one or more processors cause performance of:
contacting a website to obtain information associated with the website, the information including HTML and JavaScript comprising at least one available executable function that results in accessing a second website;
selecting a phishing policy based on the obtained information,
the phishing policy including one or more phishing models, the phishing policy including an analysis engine for determining phishing associated with the website;

selecting a phishing model from the one or more phishing models to apply to the website, the phishing model including a plurality of phishing rules;

generating a document object model (DOM) from the obtained information;

identifying the at least one available executable function by accessing the DOM;

retrieving respective incremental HTML by executing each of the at least one available executable function;

for each executed function, modify the document object model with the respective incremental HTML to yield a fully executed DOM when all of the at least one available executable function from the obtained information have been executed;

using the phishing model, extracting a set of comprising DOM features from the fully executed DOM;

applying the plurality of phishing rules to the set of features to identify the placement and location of form fields for obtaining sensitive information from a user and a ratio of the form fields to other information n within the fully executed DOM;

extracting a second set of features comprising Non-DOM features from the fully executed DOM object for the website;

applying a second plurality of phishing rules to the set second of features;

determining whether phishing is performed on the website based on the application of the plurality of phishing rules and the application of the second plurality of phishing rules;

based on a determination that phishing is performed on the website: analyzing website information to identify one or more common sources of phishing features on the website;

and upon identification of the one or more common sources, issuing a take down or blocking request to a host entity of a common source of the one or more common sources.

10. The one or more non-transitory computer-readable storage media of claim 9, wherein the information associated with the website includes one or more of: a client identifier, a website address, a designated geographic region, or a country of enforcement.

11. The one or more non-transitory computer-readable storage media of claim 9, wherein the one or more sequences of instructions, which when executed by the one or more processors cause further performance of:

based on the determination that phishing is performed on the website, periodically analyzing the website to determine whether phishing is still being performed on the website.

12. The one or more non-transitory computer-readable storage media of claim 9, wherein the one or more sequences of instructions, which when executed by the one or more processors cause further performance of:

based on a determination that phishing is performed on the website, reporting that phishing is performed on the website to an entity hosting a web server that is hosting the website.

13. The one or more non-transitory computer-readable storage media of claim 9, wherein the one or more sequences of instructions, which when executed by the one or more processors cause further performance of:

periodically analyzing websites identified as phishing websites to determine whether one or more phishing websites have been taken down.

14. The one or more non-transitory computer-readable storage media of claim 9, wherein the one or more sequences of instructions, which when executed by the one or more processors cause further performance of:

periodically analyzing websites identified as phishing websites to determine whether phishing is still being performed on one or more of the phishing websites.

15. The one or more non-transitory computer-readable storage media of claim 9, wherein the one or more sequences of instructions, which when executed by the one or more processors cause further performance of:

analyzing information from a plurality of websites identified as phishing websites to determine a central source of phishing activity.

16. The one or more non-transitory computer-readable storage media of claim 9, wherein each phishing rule of the plurality of phishing rules is a conditional statement for assessing a different feature in the set of features.

17. An apparatus comprising: one or more processors; and a memory storing instructions, which when executed by the one or more processors, cause the one or more processors to:

contact a website to obtain information associated with the website, the information including HTML and JavaScript comprising at least one available executable function that results in accessing a second website;

select a phishing policy based on the obtained information, the phishing policy including one or more phishing models, the phishing policy including an analysis engine for determining phishing associated with the website;

select a phishing model from the one or more phishing models to apply to the website, the phishing model including a plurality of phishing rules;

generate a document object model (DOM) from the obtained information;

identify the at least one available executable function by accessing the DOM;

retrieve respective incremental HTML by executing each of the at least one available executable function;

for each executed function, modify the document object model with the respective incremental HTML to yield a fully executed DOM when all of the at least one available executable function from the obtained information have been executed;

using the phishing model, extract a set of features con DOM features from the fully executed DOM;

apply the plurality of phishing rules to the set of features to identify the placement and location of form fields for obtaining sensitive information from a user and a ratio of the form fields other information within the fully executed DOM;

extract a second set of features comprising Non-DOM features from the fully executed DOM object for the website;

apply a second plurality of phishing rules to the set second of features;

determine whether phishing is performed on the web site based on the application of the plurality of phishing rules and the application of the second plurality of phishing rules;

based on a determination that phishing is performed on the website: analyzing website information to identify one or more common sources of phishing features on the web site;

and upon identification of the one or more common sources, issuing a take down or blocking request to a host entity of a common source of the one or more common sources.

18. The apparatus of claim 17, wherein the information associated with the website includes one or more of: a client identifier, a website address, a designated geographic region, or a country of enforcement.

19. The apparatus of claim 17, further comprising:
based on the determination that phishing is performed on the website, periodically analyze the website to determine whether phishing is still being performed on the website.

20. The apparatus of claim 17, further comprising:
based on a determination that phishing is performed on the website, report that phishing is performed on the website to an entity hosting a web server that is hosting the website.

\* \* \* \* \*